United States Patent
Yamaguchi et al.

(10) Patent No.: US 8,315,796 B2
(45) Date of Patent: Nov. 20, 2012

(54) NAVIGATION DEVICE

(75) Inventors: Yoshihisa Yamaguchi, Tokyo (JP); Takashi Nakagawa, Tokyo (JP); Toyoaki Kitano, Tokyo (JP); Hideto Miyazaki, Tokyo (JP); Tsutomu Matsubara, Tokyo (JP); Katsuya Kawai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 287 days.

(21) Appl. No.: 12/742,699

(22) PCT Filed: Sep. 10, 2008

(86) PCT No.: PCT/JP2008/002501
§ 371 (c)(1), (2), (4) Date: May 13, 2010

(87) PCT Pub. No.: WO2009/084134
PCT Pub. Date: Jul. 9, 2009

(65) Prior Publication Data
US 2010/0256900 A1    Oct. 7, 2010

(30) Foreign Application Priority Data
Dec. 28, 2007  (JP) ................................ 2007-339840

(51) Int. Cl.
*G01C 21/34*   (2006.01)
(52) U.S. Cl. ........ 701/437; 701/428; 701/436; 701/523; 340/995.2
(58) Field of Classification Search .................. 701/410, 701/428, 436, 437, 454, 532, 533; 348/118, 348/119; 340/995.19, 995.2, 995.27
See application file for complete search history.

(56) References Cited

U.S. PATENT DOCUMENTS

| 6,411,898 B2* | 6/2002 | Ishida et al. ................... 701/428 |
| 2001/0040505 A1* | 11/2001 | Ishida et al. ................... 340/435 |
| 2007/0010938 A1* | 1/2007 | Kubota et al. ................. 701/200 |
| 2009/0132162 A1 | 5/2009 | Kudoh et al. |

FOREIGN PATENT DOCUMENTS

| EP | 1 586 861 A1 | 10/2005 |
| JP | 10-89990 A | 4/1998 |
| JP | 10-253380 A | 9/1998 |
| JP | 11-108684 A | 4/1999 |
| JP | 2915508 B2 | 4/1999 |

(Continued)

*Primary Examiner* — Paul N Dickson
*Assistant Examiner* — Robert A Coker

(57) ABSTRACT

A navigation device includes a map database 5 that holds map data; a location and direction measurement unit 4 that measures the current location and direction of a vehicle; a route calculation unit 12 that, based on map data read from the map database 5, calculates a route from the current location measured by the location and direction measurement unit to a destination; a camera 7 that captures video images ahead of the vehicle; a video image acquisition unit 8 that acquires the video images ahead of the vehicle captured by the camera; a road width acquisition unit 16 that, based on road width data included in the map data read from the map database, calculates the width of a road segment that enters last into an intersection to which the vehicle is to be guided from among road segments that make up the route calculated by the route calculation unit; a video image composition processing unit 14 that limits the length of a portion that indicates a turning direction of a route guide arrow to the road width calculated by the road width acquisition unit, and that composes the arrow onto the video images acquired by the video image acquisition unit in a superimposing manner; and a display unit 10 that displays the video image composed by the video image composition processing unit.

8 Claims, 12 Drawing Sheets

FOREIGN PATENT DOCUMENTS

| | | |
|---|---|---|
| JP | 2001-108458 A | 4/2001 |
| JP | 2005-214857 A | 8/2005 |
| JP | 2007-94045 A | 4/2007 |
| JP | 2007-178182 A | 7/2007 |
| JP | 2007-256048 A | 10/2007 |
| JP | 2007-315861 A | 12/2007 |
| JP | 2007315861 A * | 12/2007 |

* cited by examiner (a)          (b)

(a)

(b)

(c)

(d)

(a)

(b)

NAVIGATION DEVICE

TECHNICAL FIELD

The present invention relates to a navigation device that guides a user to a destination, and more particularly to a technology for displaying guidance information on live-action or real video that is captured by a camera.

BACKGROUND ART

Known technologies in conventional car navigation devices include, for instance, route guidance technologies in which an on-board camera captures images ahead of a vehicle during cruising, and guidance information, in the form of CG (Computer Graphics), is displayed with being overlaid on video obtained through the above image capture (for instance, Patent Document 1).

As a similar technology, Patent Document 2 discloses a car navigation device in which navigation information elements are displayed so as to be readily grasped intuitively. In this car navigation device, an imaging camera attached to the nose or the like of a vehicle captures the background in the travel direction, in such a manner that a map image and a live-action video with respect to background display of navigation information elements can be selected by a selector, and the navigation information elements are displayed on a display device with being overlaid on the background image by way of an image composition unit. Patent Document 2 indicates that besides live-action video, there can also be displayed simultaneously a map having a different display mode or scale, and discloses a technique for displaying conventional maps side by side.

Patent Document 1: Japanese Patent No. 2915508
Patent Document 2: Japanese Patent Application Publication No. 11-108684 (JP-A-11-108684)

Meantime, since the road to be guided runs between buildings and the like along the road, it is desirable that guidance information to be superimposed on the video is properly overlaid on the buildings on the video. In the above conventional technologies, however, guidance information is simply superimposed on a video, and hence the guidance information is displayed closer in the foreground than (or before) all the elements on the video (buildings, signboards and the like). As a result, there is a possibility for a user to grasp an intersection to be turned erroneously.

The present invention is made to solve the aforementioned problem, and it is an object of the present invention to provide a navigation device capable of displaying suitably guidance information on a real video.

DISCLOSURE OF THE INVENTION

In order to solve the above problem, a navigation device according to the present invention comprises a map database that holds map data; a location and direction measurement unit that measures a current location and direction of a vehicle; a route calculation unit that, based on map data read from the map database, calculates a route from the current location measured by the location and direction measurement unit to a destination; a camera that captures video images ahead of the vehicle; a video image acquisition unit that acquires the video images ahead of the vehicle that are captured by the camera; a road width acquisition unit that, based on road width included in the map data read from the map database, calculates the width of a road segment that enters into an intersection to which the vehicle is to be guided, from among road segments that make up the route calculated by the route calculation unit; a video image composition processing unit that limits the length of a portion that indicates a turning direction of a route guide arrow to the road width calculated by the road width acquisition unit, and that composes the arrow onto the video images acquired by the video image acquisition unit in a superimposing manner; and a display unit that displays the video image composed by the video image composition processing unit.

In the navigation device according to the present invention, the length of a portion of a route guide arrow that indicates a turning direction is set in accordance with the road width during display of a route guide arrow overlaid or superimposed on a video of the surroundings of a vehicle obtained by camera 7 capture, in such a manner that the route guide arrow is not superimposed on buildings to be displayed closer in the foreground than the route guide arrow. This allows avoiding the problem of display of an erroneous superimposing relationship between a route guide arrow and buildings along the road, and also allows suitably displaying guidance information on live-action video.

BEST MODE FOR CARRYING OUT THE INVENTION

The present invention is explained in detail below on the basis of preferred embodiments for realizing the invention with reference to accompanying drawings.

Embodiment 1

Figure 1:
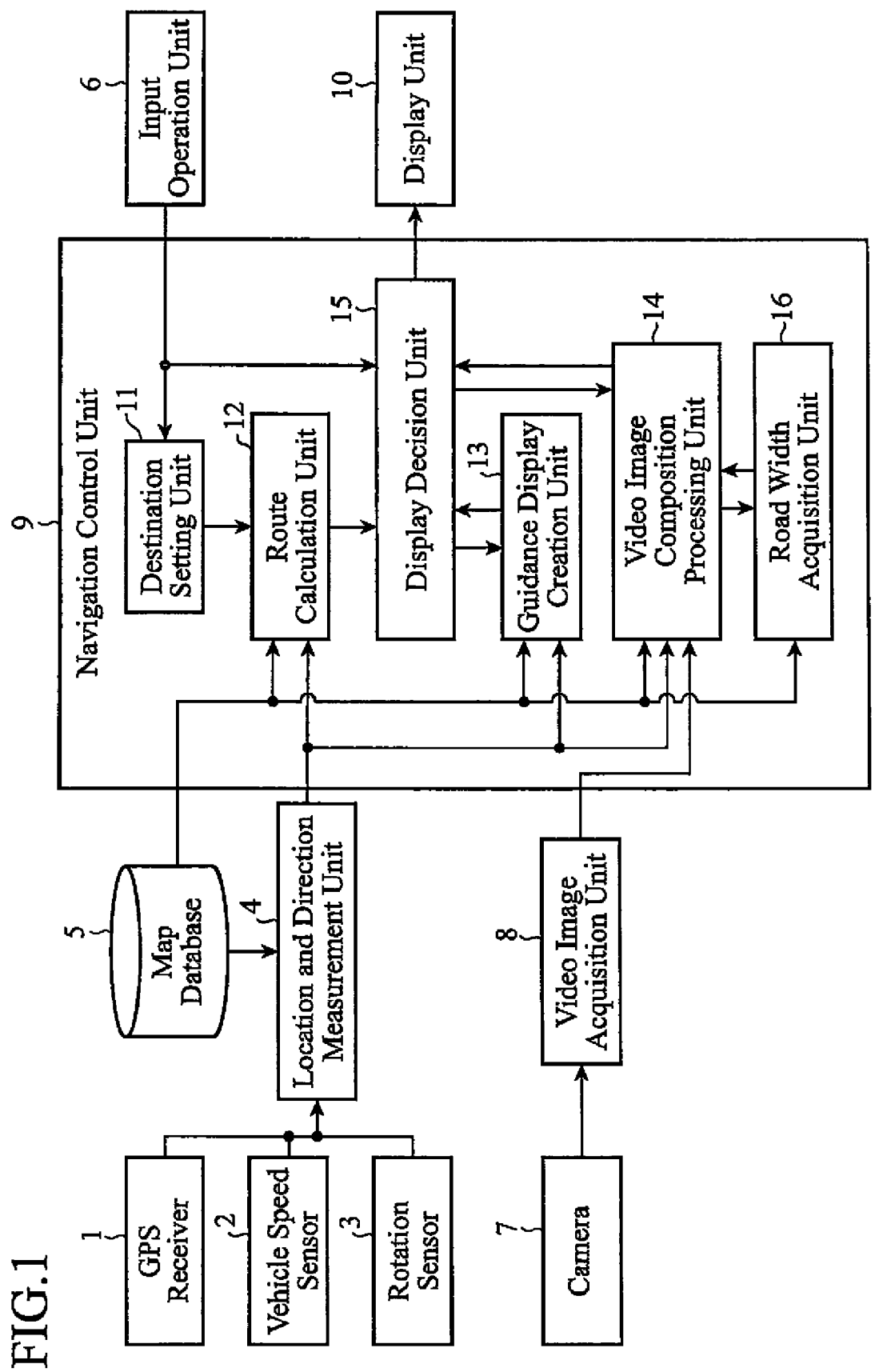
FIG. 1 is a block diagram showing the configuration of a car navigation device according to Embodiment 1 of the present invention.

FIG. 1 is a block diagram showing the configuration of a navigation device according to Embodiment 1 of the present invention, in particular, a car navigation device used in a vehicle. The car navigation device includes a GPS (Global Positioning System) receiver 1, a vehicle speed sensor 2, a rotation sensor (gyroscope) 3, a location and direction measurement unit 4, a map database 5, an input operation unit 6, a camera 7, a video image acquisition unit 8, a navigation control unit 9 and a display unit 10.

The GPS receiver 1 measures a vehicle location by receiving radio waves from a plurality of satellites. The vehicle location measured by the GPS receiver 1 is sent as a vehicle location signal to the location and direction measurement unit 4. The vehicle speed sensor 2 sequentially measures the speed of the vehicle. The vehicle speed sensor 2 is generally composed of a sensor that measures tire revolutions. The speed of the vehicle measured by the vehicle speed sensor 2 is sent as a vehicle speed signal to the location and direction measurement unit 4. The rotation sensor 3 sequentially measures the travel direction of the vehicle. The traveling direction (hereinafter, simply referred to as "direction") of the vehicle as measured by the rotation sensor 3 is sent as a direction signal to the location and direction measurement unit 4.

The location and direction measurement unit 4 measures the current location and direction of the vehicle on the basis of the vehicle location signal sent from the GPS receiver 1. In the case where the space over the vehicle is blocked by a tunnel surrounding buildings or the like, the number of satellites that can receive radio waves is zero or reduced to impair the reception status thereof. The current location and direction may fail to be measured on the basis of the vehicle location signal of the GPS receiver 1 alone, or even if the measurement is possible, the precision thereof may be deteriorated. Therefore, the vehicle location is measured, to carry out processing for compensating measurements performed by the GPS receiver 1 by dead reckoning (autonomous navigation) using the vehicle speed signal from the vehicle speed sensor 2 and the direction signal from the rotation sensor 3.

The current location and direction of the vehicle as measured by the location and direction measurement unit 4 contains various errors that arise from, for instance, impaired measurement precision due to deterioration of the reception status in the GPS receiver 1, as mentioned above, or vehicle speed errors on account of changes in diameter of tires due to wear thereof and/or changes of temperature, or errors attributable to the precision of the sensors themselves. The location and direction measurement unit 4, therefore, corrects the current location and direction of the vehicle that are obtained by measurements and contain errors by map-matching using road data acquired from the map data that is read from the map database 5. The corrected current location and direction of the vehicle are sent as vehicle location and direction data to the navigation control unit 9.

The map database 5 holds map data that includes road data such as road location, road type (expressway, toll road, ordinary road, narrow street and the like), restrictions relating to the road (speed restrictions, one-way traffic and the like), or the number of lanes in the vicinity of an intersection, as well as data on facilities around the road. Roads are represented as a plurality of nodes and straight line links that join the nodes. Road location is expressed by recording the latitude and longitude of each node. For instance, three or more links connected in a given node indicate a plurality of roads that intersect at the location of the node. The map data held in the map database 5 is read by the location and direction measurement unit 4, as described above, and also by the navigation control unit 9.

The input operation unit 6 is composed of at least one from among a remote controller, a touch panel, a voice recognition device, and so on, and is operated by the user, i.e. the driver or a passenger, for inputting a destination, or for selecting information supplied by the car navigation device. The data created through the operations in the input operation unit 6 is sent as operation data to the navigation control unit 9.

The camera 7 is composed of at least one of a camera that captures images ahead of the vehicle, a camera capable of capturing images simultaneously over a wide range of directions containing the whole surroundings thereof, or the like. The camera 7 captures images of the neighborhood of the vehicle including the traveling direction of the vehicle. The video signals obtained through capturing images by the camera 7 are sent to the video image acquisition unit 8.

The video image acquisition unit 8 converts the video signals sent from the camera 7 into digital signals that can be processed by a computer. The digital signals obtained through conversion by the video image acquisition unit 8 are sent as video data to the navigation control unit 9.

The navigation control unit 9 carries out data processings in order to provide a function for displaying a map of the surroundings of the vehicle in which the car navigation device is provided, wherein the function may include calculating a guidance route up to a destination inputted from the input operation unit 6, creating guidance information in accordance with the guidance route and the current location and direction of the vehicle, or creating a guide map that combines a map of the surroundings of the vehicle location and a vehicle mark that denotes the vehicle location; and a function of guiding the vehicle to the destination. In addition, the navigation control unit 9 carries out data processings for searching information such as traffic information, sightseeing sites, restaurants, shops and the like relating to the destination or to the guidance route, and for searching facilities that match the conditions inputted from the input operation unit 6. The navigation control unit 9 is explained in detail below. The display data obtained through the processings in the navigation control unit 9 is sent to the display unit 10.

The display unit 10 is composed of, for instance, an LCD (Liquid Crystal Display), and displays a map and/or live-action vide on the screen based on the display data sent from the navigation control unit 9.

Next, the details of the navigation control unit 9 will be described. The navigation control unit 9 includes a destination setting unit 11, a route calculation unit 12, a guidance display creation unit 13, a video image composition processing unit 14, a display decision unit 15 and a road width acquisition unit 16. To prevent cluttering in the figure, part of the connections between the various constituent elements above is omitted in FIG. 1. The omitted portions will be explained as they appear.

The destination setting unit 11 sets a destination in accordance with the operation data sent from the input operation unit 6. The destination set by the destination setting unit 11 is sent as destination data to the route calculation unit 12. The route calculation unit 12 calculates a guidance route up to the destination on the basis of destination data sent from the destination setting unit 11, vehicle location and direction data sent from the location and direction measurement unit 4, and map data read from the map database 5. The guidance route calculated by the route calculation unit 12 is sent as guidance route data to the display decision unit 15.

In response to an instruction by the display decision unit 15, the guidance display creation unit 13 creates a guide map (hereinafter, referred to as "chart-guide map") based on a chart used in conventional car navigation devices. The chart-guide map created by the guidance display creation unit 13 includes various guide maps that do not utilize live-action video, for instance planimetric maps, intersection close-up maps, highway schematic maps and the like. The chart-guide map is not limited to a planimetric map, and may be a guide map employing three-dimensional CG, or a guide map that is a bird's-eye view of a planimetric map. Techniques for creating a chart-guide map are well known, and a detailed explanation thereof will be omitted. The chart-guide map created by the guidance display creation unit 13 is sent as chart-guide map data to the display decision unit 15.

In response to an instruction by the display decision unit 15, the video image composition processing unit 14 creates a guide map that uses live-action video (hereinafter, referred to as "live-action guide map"). For instance, the video image composition processing unit 14 acquires, from the map data read from the map database 5, information on nearby objects around the vehicle, such as road networks, landmarks and intersections, and creates a live-action guide map, made up of a content-composed video in which there are overlaid a graphic for describing the shape, purport and the like of nearby objects, as well as character strings, images and the like (hereinafter, referred to as "content"), around the nearby objects that are present in live-action video that is represented by the video data sent from the video image acquisition unit 8.

As described above, the display decision unit 15 instructs the guidance display creation unit 13 to create a chart-guide map, and also instructs the video image composition processing unit 14 to create a live-action guide map. The display decision unit 15 decides the content to be displayed on the screen of the display unit 10 on the basis of vehicle location and direction data sent from the location and direction measurement unit 4, map data of the vehicle surroundings read from the map database 5, operation data sent from the input operation unit 6, chart-guide map data sent from the guidance display creation unit 13 and live-action guide map data sent from the video image composition processing unit 14. The data corresponding to the display content decided by the display decision unit 15 is sent as display data to the display unit 10.

In such a way, the display unit 10 displays, for instance, an intersection close-up view, when the vehicle approaches an intersection, or displays a menu when a menu button of the input operation unit 6 is pressed, or displays a live-action guide map, using live-action video, when a live-action display mode is set by the input operation unit 6. Switching to a live-action guide map that uses a live-action video can be configured to take place also when the distance to an intersection at which the vehicle is to turn is equal to or smaller than a given value, in addition to when a live-action display mode is set.

Also, the guide map displayed on the screen of the display unit 10 can be configured so as to display simultaneously in one screen a live-action guide map and a chart-guide map such that the chart-guide map (for instance, a planimetric map) created by the guidance display creation unit 13 is disposed on the left of the screen, and a live-action guide map (for instance, an intersection close-up view using a live-action video) created by the video image composition processing unit 14 is disposed on the right of the screen.

Figure 2:
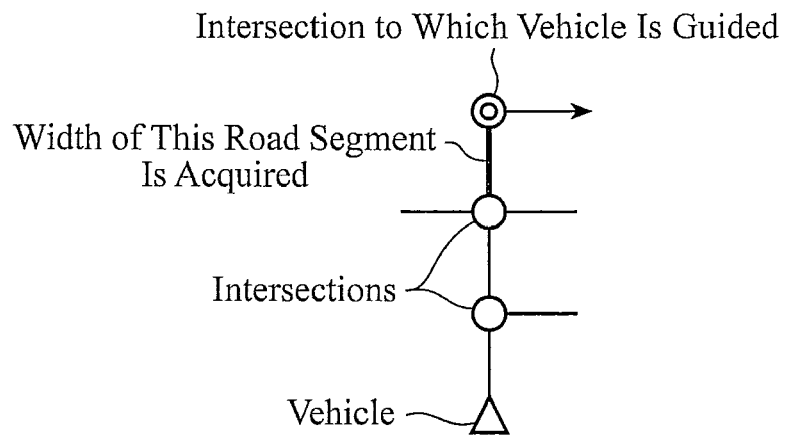
FIG. 2 is a diagram for illustrating a road segment that is used in the calculation of a road width in the car navigation device according to Embodiment 1 of the present invention.

In response to an instruction from the video image composition processing unit 14, the road width acquisition unit 16 acquires the width of a road segment that enters last into an intersection to which the vehicle is guided (denoted by a heavy line in FIG. 2), from among the road segments that make up the route from the vehicle location to the intersection to which the vehicle is guided, as illustrated in FIG. 2. More specifically, the road width acquisition unit 16 acquires guidance route data from the route calculation unit 12 via the video image composition processing unit 14; decides the road segment that enters last into an intersection to which the vehicle is guided by comparing the acquired guidance route data with map data read from the map database 5; acquires road data that represent the decided road from among map data read from the map database 5; and acquires road width data included in the acquired road data. The road width data acquired by the road width acquisition unit 16 is sent to the video image composition processing unit 14.

Figure 3:
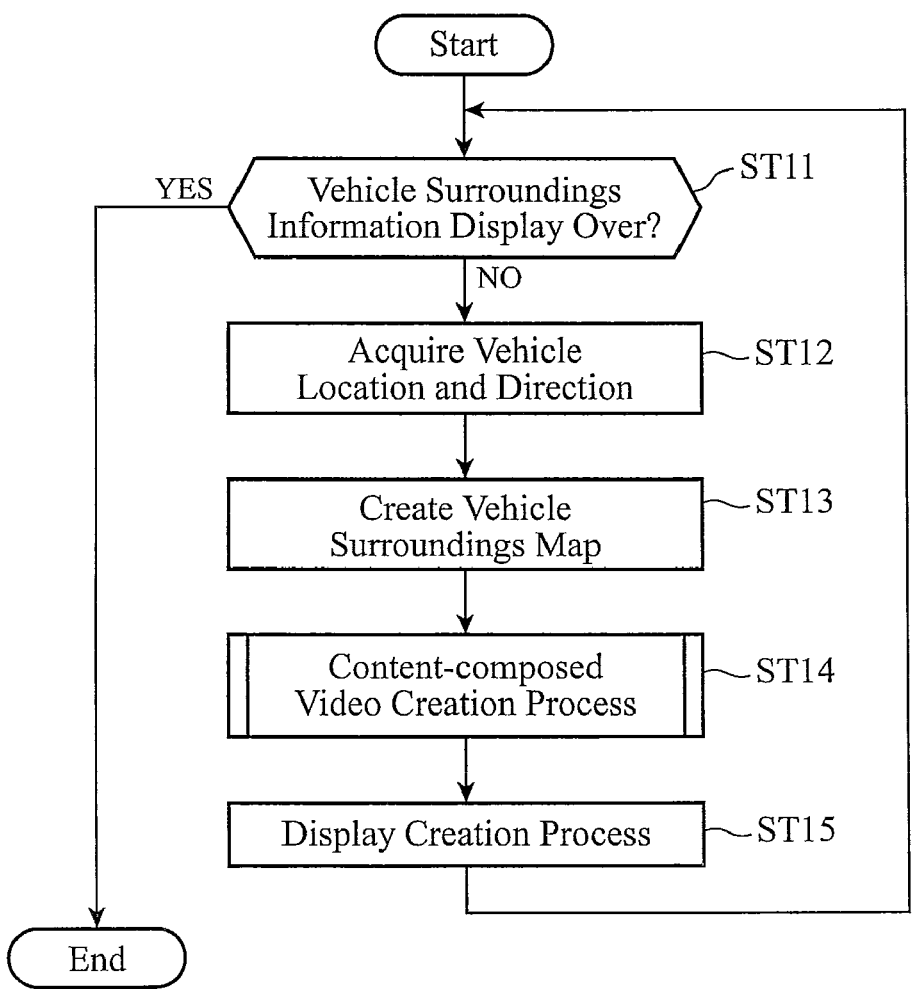
FIG. 3 is a flowchart illustrating the operation of the car navigation device according to Embodiment 1 of the present invention, focusing on a display process of vehicle surroundings information.

Next, with reference to the flowchart illustrated in FIG. 3, the operation of the car navigation device according to Embodiment 1 of the present invention having the above configuration will be described with focusing on a vehicle surroundings information display process. In the vehicle surroundings information display process there is created a vehicle surroundings map, as a chart-guide map, resulting from overlaying a graphic (vehicle mark) denoting the vehicle location onto a map of the surroundings of the vehicle, and there is created also a content-composed video (described in detail below), as a live-action guide map, in accordance with the motion of the vehicle, such that the vehicle surroundings map and the content-composed video are combined and the result is displayed on the display unit 10.

In the vehicle surroundings information display process there is checked first whether vehicle surroundings information display is over or not (step ST11). Specifically, the navigation control unit 9 determines whether the input operation unit 6 has instructed termination of vehicle surroundings information display. The vehicle surroundings information display process is terminated when in step ST11 it is determined that vehicle surroundings information display is over.

On the other hand, when in step ST11 it is determined that vehicle surroundings information display is not over, the vehicle location and direction is then acquired (step ST12). Specifically, the navigation control unit 9 acquires vehicle location and direction data from the location and direction measurement unit 4.

Then, a vehicle surroundings map is created (step ST13). Specifically, the guidance display creation unit 13 of the navigation control unit 9 searches in the map database 5 for map data of the vehicle surroundings, in the scale that is set at that point in time, on the basis of the vehicle location and direction data acquired in step ST12. A vehicle surroundings map is created then that composes a vehicle mark, denoting vehicle location and direction, onto a map represented by the map data obtained in the search.

Additionally, the destination is set and the guidance route is calculated, respectively, in the destination setting unit 11 and the route calculation unit 12 of the navigation control unit 9. When guidance to the destination requires a left or right turn, the guidance display creation unit 13 further creates a vehicle surroundings map that combines a graphic such as an arrow for indicating the road that the vehicle has to travel (hereinafter, referred to as "route guide arrow") overlaid onto the vehicle surroundings map.

Then, the content-composed video creation process is carried out (step ST14). Specifically, the video image composition processing unit 14 of the navigation control unit 9 searches for information on nearby objects around the vehicle from among map data read from the map database 5, and creates a content-composed video in which content on a nearby object is overlaid around that nearby object in a video of the surroundings of the vehicle acquired by the video image acquisition unit 8. The particulars of the content-composed video creation process of step ST14 will be explained in detail further below with reference to the flowchart shown in FIG. 4.

Then, a display creation process is carried out (step ST15). Specifically, the display decision unit 15 of the navigation control unit 9 creates display data per one screen by combining a chart-guide map that comprises the vehicle surroundings map created by the guidance display creation unit 13 in step ST13, and the live-action guide map that comprises the content-composed video created by the video image composition processing unit 14 in step ST14. The created display data is sent to the display unit 10, whereby the chart-guide map and the live-action guide map are displayed on the screen of the display unit 10. The sequence returns thereafter to step ST11, and the above-described process is repeated.

Figure 4:
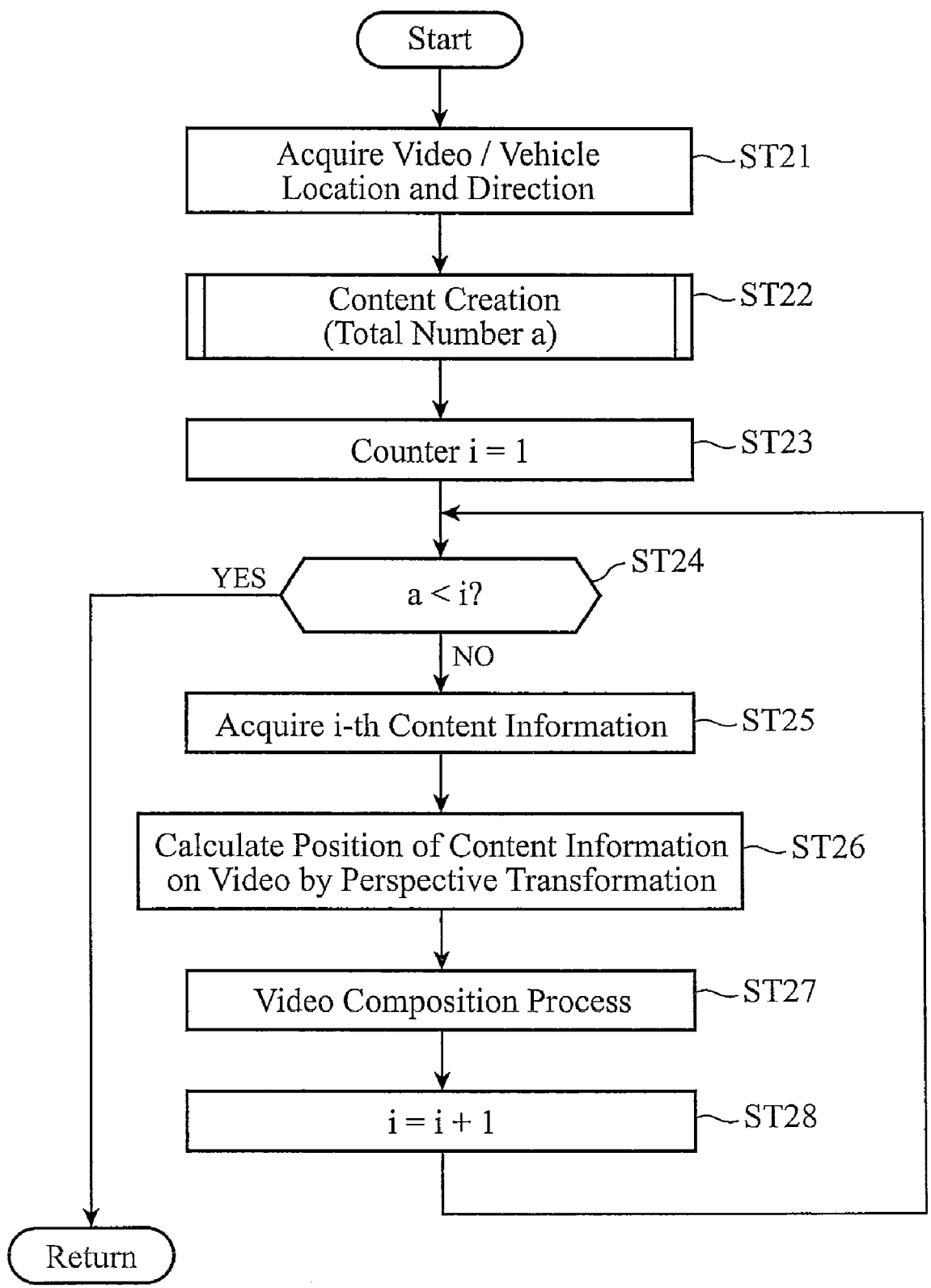
FIG. 4 is a flowchart illustrating the details of a content-composed video creation process that is carried out in the vehicle surroundings information display process of the car navigation device according to Embodiment 1 of the present invention.

Next, the details of the content-composed video creation process that is carried out in step ST14 will be described with reference to the flowchart shown in FIG. 4. The content-composed video creation process is carried out mainly by the video image composition processing unit 14.

In the content-composed video creation process, video as well as the vehicle location and direction are acquired first (step ST21). Specifically, the video image composition processing unit 14 acquires vehicle location and direction data acquired in step ST12 of the vehicle surroundings information display process (FIG. 3), as well as video data created at that point in time by the video image acquisition unit 8.

Then, a content is created (step ST22). Specifically, the video image composition processing unit 14 searches for nearby objects of the vehicle on the basis of map data read from the map database 5, and creates, from the searched nearby objects, content information that is to be presented to the user. In case of guidance to the destination by indicating left and right turns to the user, the content information includes, for instance, a character string with the name of the intersection, the coordinates of the intersection, and the coordinates of a route guide arrow. When the vehicle is to be guided to a noteworthy landmark in the surroundings of the vehicle, the content information includes, for instance, a character string or pictures with information relating to the landmark, such as a character string with the name of the landmark, the coordinates of the landmark, as well as history, highlights, opening times and the like relating to the landmark. In addition to the above, the content information may also include coordinates on the road network that surrounds the vehicle, and map information on, for instance, number of lanes and traffic restriction information, such as one-way traffic, or prohibited entry, for each road of the road network around the vehicle. The particulars of the content creation process that is carried out in step ST22 are explained in detail below.

The coordinates in the content information are given by a coordinate system (hereinafter, referred to as "reference coordinate system") that is uniquely determined on the ground, for instance latitude and longitude. In step ST22 there is decided the content to be presented to the user, as well as the total number of contents a.

Then, the value i of the counter is initialized (step ST23). That is, the value i of the counter for counting the number of contents already composed is set to "1". The counter is provided in the video image composition processing unit 14.

Then, it is checked whether the composition process is over for all the pieces of content information (step ST24). Specifically, the video image composition processing unit 14 determines whether or not the number of contents i already composed, which is the value of the counter, is greater than the total number of contents a. When in step ST24 it is determined that the composition process is over for all the content information, i.e. that the number of contents i already composed is greater than the total number of contents a, the content-composed video creation process is terminated, and the sequence returns to the vehicle surroundings information display process.

On the other hand, when in step ST24 it is determined that the composition process is not over for all the content information, i.e. that the number of contents i already composed is not greater than the total number of contents a, there is acquired i-th content information (step ST25). Specifically, the video image composition processing unit 14 acquires an i-th content information item from among the content information created in step ST22.

Then, there is calculated the location of the content information on the video, through perspective transformation (step ST26). Specifically, the video image composition processing unit 14 calculates the location of the content acquired in step ST25, in the reference coordinate system in which the content is to be displayed, on the basis of the vehicle location and direction acquired in step ST21 (location and direction of the vehicle in the reference coordinate system); the location and direction of the camera 7 in the coordinate system referenced to the vehicle; and characteristic values of the camera 7 acquired beforehand, such as field angle and focal distance. The above calculation is identical to a coordinate transform calculation called perspective transformation.

Then, a video composition process is carried out (step ST27). Specifically, the video image composition processing unit 14 composes contents such as graphics, character strings or images, denoted by the content information acquired in step ST25 at the locations calculated in step ST26 on the video acquired in step ST21.

Then, the value i of the counter is incremented (step ST28). Specifically, the video image composition processing unit 14 increments (+1) the value of the counter. The sequence returns thereafter to step ST24, and the above-described process is repeated.

It is noted that the above-described video image composition processing unit 14 is configured so as to compose content onto video using a perspective transformation, but may also be configured so as to recognize targets within the video by subjecting the video to an image recognition process, and by composing content onto the recognized video.

Figure 5:
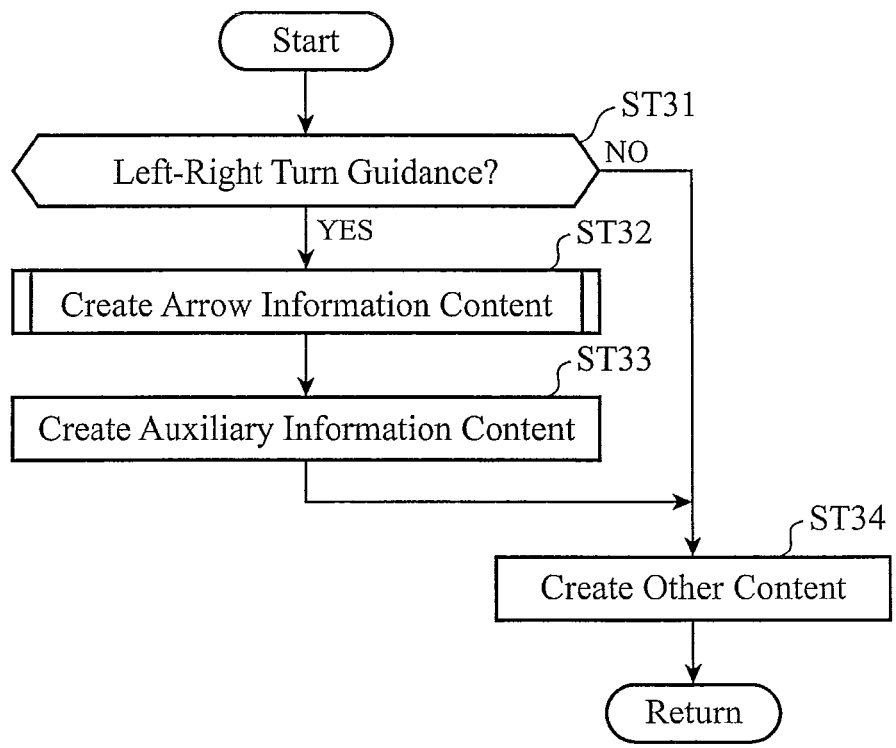
FIG. 5 is a flowchart illustrating the details of a content creation process that is carried out in the content-composed video creation process of the car navigation device according to Embodiment 1 of the present invention.

Next, the details of the content creation process that is carried out in step ST22 of the above-described content-composed video creation process (FIG. 4) will be described with reference to the flowchart shown in FIG. 5.

In the content creation process it is checked first whether the vehicle is in left-right turn guidance (step ST31). Specific conditions for deciding whether the vehicle is in left-right turn guidance include, for instance, that a route up to a destination set by the user is searched through calculation by the route calculation unit 12, and that the vehicle has reached the periphery of the intersection, along the searched route, at which the vehicle is to turn left or right. The "periphery of the intersection" is, for instance, a range set by the user or the manufacturer or the car navigation device, and may be, for instance, 500 m before the intersection.

When in step ST31 it is determined that the vehicle is not in left-right turn guidance, the sequence proceeds to step ST34. On the other hand, when in step ST31 it is determined that the vehicle is in left-right turn guidance, it is acknowledged that a route guide arrow is required as a content, whereupon an arrow information content is then created (step ST32). The arrow information content to be created denotes herein a graphic of a left-right turn guide arrow that is overlaid onto live-action video, in order to indicate to the user the direction to which to turn, left or right, at the waypoint where the vehicle is to turn left or right. The left-right turn guide arrow created in step ST32 is added as a display content. The content creation process of the arrow information in step ST32 is explained in detail further below.

Then, an auxiliary information content is created (step ST33). Herein, the auxiliary information content denotes an auxiliary content, other than the left-right turn guide arrow, that is necessary for performing left-right turn guidance, for instance a mark that indicates the center of the intersection, and the distance from the vehicle to the intersection. The auxiliary information content created in step ST33 is added as a display content. Depending on the settings of the car navigation device, in some cases no auxiliary information content need be created, and thus no content is created. The sequence proceeds thereafter to step ST34.

Other contents are created in step ST34. Specifically, contents other than contents necessary for left-right turn guidance are created to be added as contents for display. The content created in step ST34 may include, for instance, a route up to a destination or a road network that surrounds the vehicle. After that, the content composition process is completed to return to the content-composed video creation process (FIG. 4).

Figure 6:
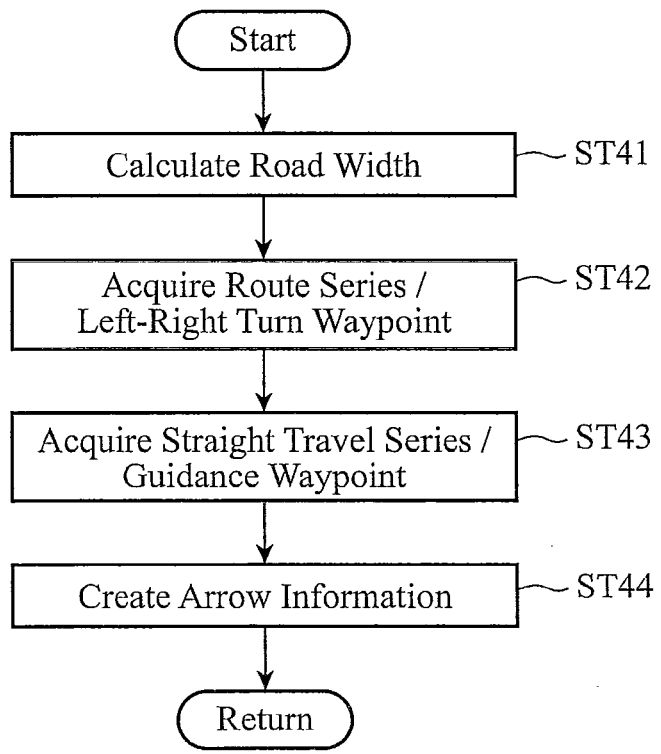
FIG. 6 is a flowchart illustrating the details of a content creation process of arrow information that is carried out in the content creation process of the car navigation device according to Embodiment 1 of the present invention.

Next, the details of the content creation process of the arrow information carried out in step ST32 of the above-described content creation process (FIG. 5) will be described with reference to the flowchart illustrated in FIG. 6.

Figure 7:
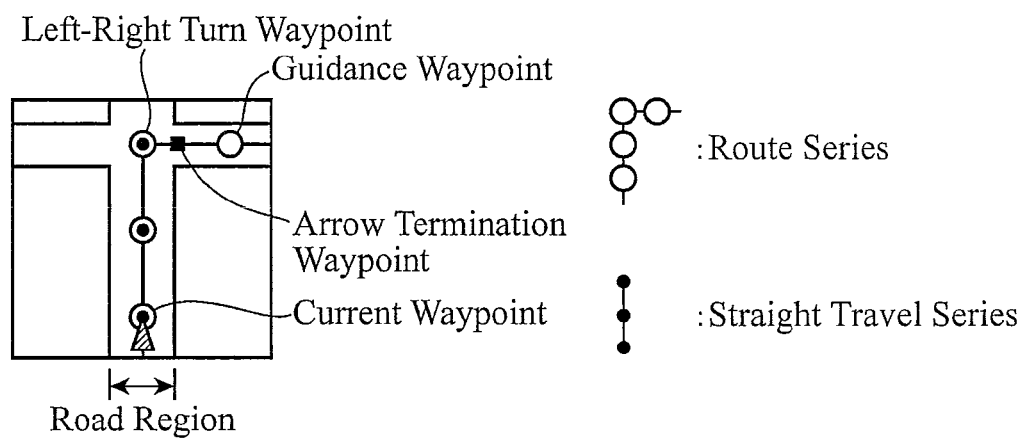
FIG. 7 is a diagram for illustrating a road region that is calculated in the car navigation device according to Embodiment 1 of the present invention.

In the content creation process for arrow information, firstly, there is calculated a road region (step ST41). A road region denotes herein a region that is free of buildings in the surroundings, as viewed from the location of a traveling vehicle, for instance as illustrated in FIG. 7. Specifically, the video image composition processing unit 14 instructs the road width acquisition unit 16 to acquire road width data. The road width acquisition unit 16 acquires road width data on the road that the vehicle is traveling from among the road data included in the map data that is read from the map database 5, and sends the acquired road width data to the video image composition processing unit 14. The video image composition processing unit 14 calculates as a road region, the region resulting from taking the halves of the width denoted by the road width data, on the left and right of the travel direction of the vehicle. The road region may also be determined taking into account, for instance, the heading of the vehicle, the cruising lanes, the number of lanes in the road, and so forth.

Then, there is obtained a route series and left-right turn waypoint (step ST42). Specifically, the video image composition processing unit 14 acquires a route series and a left-right turn waypoint as illustrated in FIG. 7 from road data included in the map data that is read from the map database 5. The route series is a series of coordinates created through route search that denotes the route from the current waypoint to a destination. The left-right turn waypoint is the next intersection at which the vehicle is to turn left or right, and is represented by the coordinates of a relevant point in the route series.

Then, a straight travel series and a guidance waypoint are acquired (step ST43). Specifically, the video image composition processing unit 14 decides a straight travel series and a guidance waypoint such as those illustrated in FIG. 7 on the basis of the route series and the left-right turn waypoint acquired in step ST42. The straight travel series is a series that denotes the segments that the vehicle is to travel in a straight line from the current waypoint, and is represented, for instance, by a series of coordinates from the current waypoint in the route series up to a left-right turn waypoint. Guidance waypoints are waypoints that indicate the direction, left or right, to which the vehicle is to turn. The guidance waypoints are represented, for instance, by coordinates that are held next to those of a left-right turn waypoint in a route series.

Then, arrow information is created (step ST44). Specifically, the video image composition processing unit 14 creates a content having information on left-right turn guide arrows on the basis of the straight travel series and the guidance waypoint. Information on left-right turn guide arrow includes, for instance, a straight travel series, an arrow termination waypoint, and display format information. An arrow termination waypoint is a waypoint in the direction to which the vehicle turns, left or right, and which does not go beyond the road region, as illustrated in FIG. 7. The arrow termination waypoint lies, for instance, on a segment that connects a left-right turn waypoint and a guidance waypoint. Arrow termination waypoints are represented by coordinates of waypoints within the road region. Display format information is information that denotes, for instance, thickness, brightness, saturation, color, translucency and the like. Thereafter, the content creation process of the arrow information is completed to returns the content creation process (FIG. 5).

It is noted that the coordinates used in the content creation process of the arrow information are values that can determine uniquely locations on a two-dimensional map, for instance, latitude and longitude.

Figure 8:
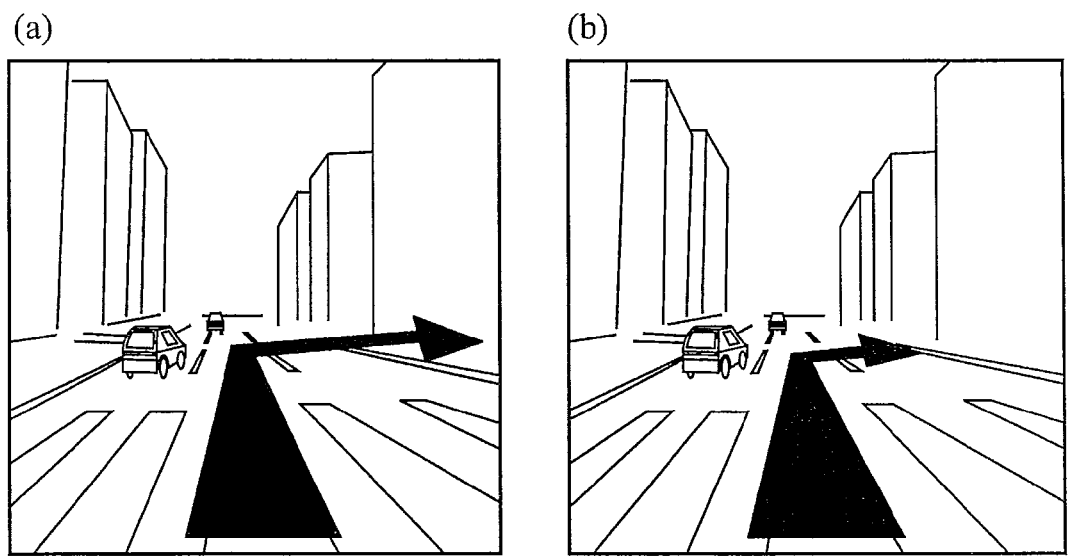
FIG. 8 is a diagram showing an example of videos displayed on the screen of a display unit in the car navigation device according to Embodiment 1 of the present invention.

FIG. 8 shows an example of videos displayed on the screen of the display unit 10 based on the above-described processes. FIG. 8(*a*) depicts a display example of a route guide arrow in a conventional car navigation device. The length of the portion of the route guide arrow indicating the turning direction is limited to the guidance waypoint, irrespective of the width of the road. As a result, the route guide arrow and a landmark by the road may overlap each other, which may cause the user to confuse the intersection at which the vehicle is to turn. In the display example of the route guide arrow of the car navigation device according to Embodiment 1 shown in FIG. 8(b), by contrast, the length of the portion of the route guide arrow that indicates the turning direction is limited to the road width. As a result, the route guide arrow and a landmark existing beside the road do not overlap, and thus the user can easily identify the intersection at which the vehicle is to turn.

As described above, in the car navigation device according to Embodiment 1 of the present invention, the length of the portion of the route guide arrow that indicates the turning direction is limited to the road width, in such a manner that the route guide arrow and buildings to be displayed closer in the foreground than (or before) the route guide arrow are not superimposed on each other when the route guide arrow is displayed in a superimposing manner on the vehicle surroundings video captured by the camera 7. Therefore, the car navigation device according to Embodiment 1 allows avoiding the problem of display of an erroneous superimposing relationship between a route guide arrow and buildings along the road.

Embodiment 2

In the car navigation device according to Embodiment 2 of the present invention, a left-right turn guide arrow, which is one of the route guide arrows, is divided into a visible portion and a blocked portion, so that the blocking relationship with the buildings can be visualized by changing the above two display forms. The visible portion is a portion of the left-right turn guide arrow that is not blocked and that can be viewed as usual. The blocked portion is a portion of the left-right turn guide arrow that is to be displayed as being blocked by a building. The configuration of the car navigation device according to Embodiment 2 is identical to that according to Embodiment 1 shown in FIG. 1.

Except for the content creation process of the arrow information (step ST32 in FIG. 5, and FIG. 6), the operation of the car navigation device according to Embodiment 2 is identical to that of the car navigation device according to Embodiment 1. In the following, the content creation process of the arrow information in the car navigation device according to Embodiment 2 will be described with reference to the flowchart illustrated in FIG. 6 used for describing the content creation process of the arrow information in the car navigation device according to Embodiment 1.

The content creation process of the arrow information from step ST41 to step ST43 is identical to the content creation process of the arrow information of the car navigation device according to Embodiment 1, and only the arrow information creation process that is carried out in step ST44 is different. Thus, only features different from those of Embodiment 1 will be explained below.

Figure 9:
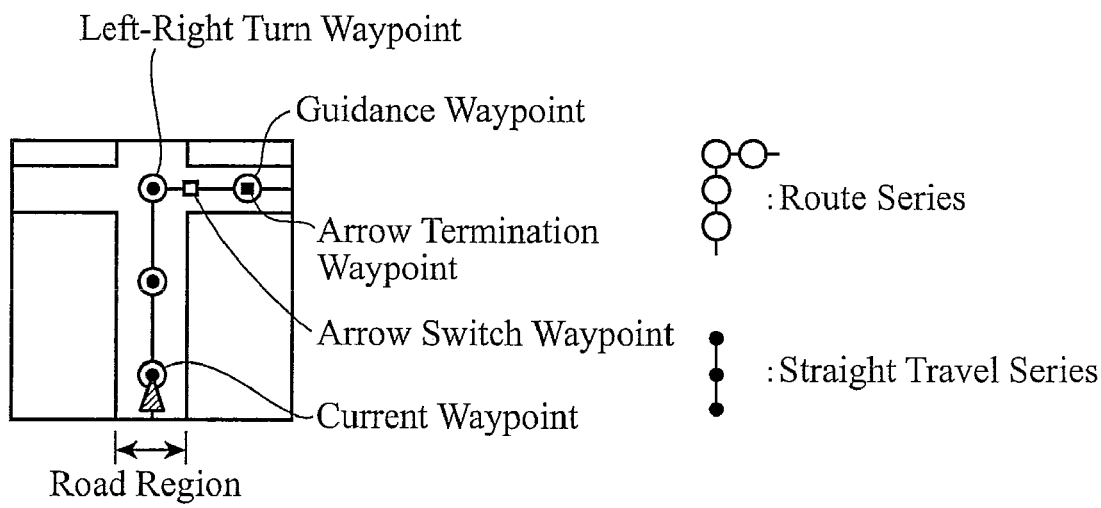
FIG. 9 is a diagram for illustrating left-right turn guide arrow information used in a car navigation device according to Embodiment 2 of the present invention.

Arrow information is created in step ST44. Specifically, the video image composition processing unit 14 creates a content having information on a left-right turn guide arrow on the basis of a straight travel series and a guidance waypoint. Information on left-right turn guide arrow includes, for instance, a straight travel series, an arrow termination waypoint, an arrow switch waypoint, display format information on the visible portion, and display format information on the blocked portion. The arrow termination waypoint is represented by the coordinates of a guidance waypoint in the direction to which the vehicle is to turn left or right, as illustrated in FIG. 9. As shown in FIG. 9, the arrow switch waypoint is a waypoint at the boundary between the visible portion and the blocked portion of a left-right turn guide arrow. The arrow switch waypoint lies on a segment that connects a left-right turn waypoint and an arrow termination waypoint, and is represented by coordinates of a waypoint within the road region. The display format information of the visible portion is information for visually indicating that the arrow is an ordinary arrow. The display format information of the blocked portion is information for visually indicating that part of the arrow is a blocked portion, by way of information attributes that are different from those of the visible portion. Thereafter, the content creation process of the arrow information is completed to return to the content creation process (FIG. 5).

Attributes of the display format information for the above-mentioned visual distinction may include, for instance, thickness, brightness, saturation, color, translucency and the like. When distinguishing portions by thickness, for instance, the blocked portion may be thinner than the visible portion. When distinguishing portions by brightness, for instance, the blocked portion may be duller than the visible portion. When distinguishing portions by saturation, for instance, the blocked portion may be less saturated than the visible portion. When distinguishing portions by color, for instance, the visible portion may be rendered with warm colors such as yellow or orange, and the blocked portion with cool colors such as blue or green. When distinguishing portions by translucence, for instance, the visible portion may be rendered opaque, and the blocked portion translucent.

Figure 10:
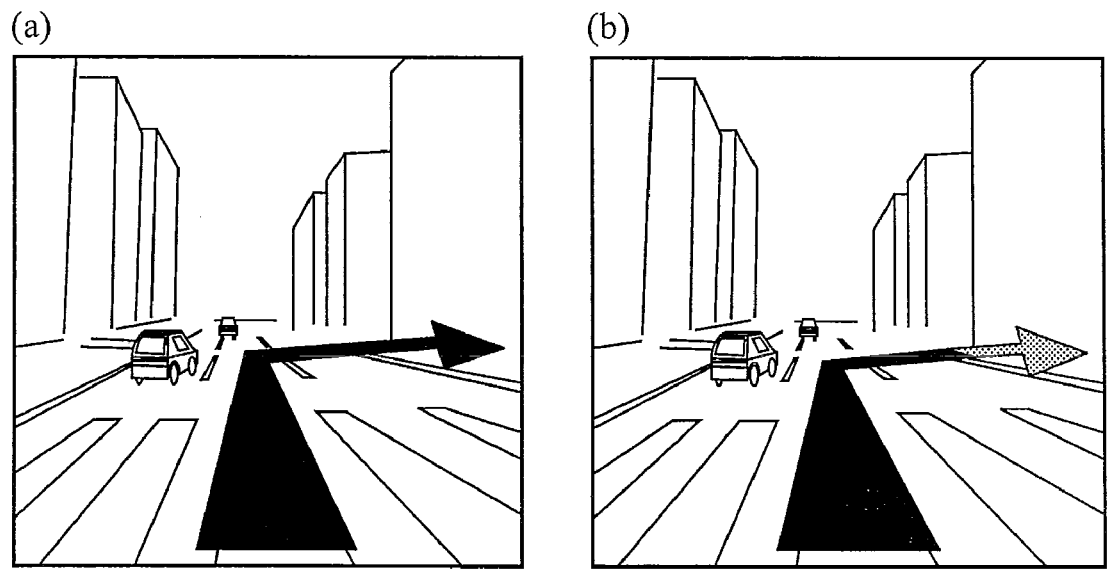
FIG. 10 is a diagram showing an example of videos displayed on the screen of a display unit in the car navigation device according to Embodiment 2 of the present invention.

FIG. 10 shows an example of video displayed on the screen of the display unit 10 as a result of the above-described processes. FIG. 10(a) depicts a display example of a route guide arrow in a conventional car navigation device. The length of the portion of the route guide arrow that indicates the turning direction reaches up to the guidance waypoint, independently from the width of the road. Therefore, the route guide arrow and a landmark by the road may be superimposed on each other, which may cause the user to confuse the intersection at which the vehicle is to turn. In the display example of the route guide arrow of the car navigation device according to Embodiment 2 shown in FIG. 10(b), although the length of the portion of the route guide arrow that indicates the turning direction reaches up to the guidance waypoint, there is changed the display format of the portion beyond the road width, taking the road width portion as a boundary, so that the color of a portion at which the route guide arrow and buildings overlap is different from the color of a portion of no building overlap. As a result, the user can easily grasp the intersection at which the vehicle is to turn.

As described above, in the car navigation device according to Embodiment 2 of the present invention, the route guide arrow is visually modified by changing the display format (for instance, thickness, color, translucency, brightness or saturation) of the portion of the route guide arrow beyond the road width, at a portion where the route guide arrow superimposes with buildings that are to be displayed before the route guide arrow, when the route guide arrow is displayed in a superimposing manner on the a vehicle surroundings video captured by the camera 7. A correct superimposing relationship between the route guide arrow and buildings along the road can be displayed as a result to the user.

Embodiment 3

When the map database 5 does not hold road width data of the road that the vehicle is cruising, the car navigation device according to Embodiment 3 of the present invention estimates the road width on the basis of other information, and determines a road region based on the estimation results. The configuration of the car navigation device of Embodiment 3 is identical to that of Embodiment 1 illustrated in FIG. 1.

Except for the content creation process of the arrow information (step ST32 in FIG. 5, and FIG. 6), the operation of the car navigation device according to Embodiment 3 is identical to the operation of the car navigation device according to Embodiment 1. In the following, the content creation process of the arrow information in the car navigation device according to Embodiment 3 will be described with reference to the flowchart illustrated in FIG. 6 used for describing the content creation process of the arrow information in the car navigation device according to Embodiment 1.

In the content creation process for arrow information, firstly, there is calculated a road region (step ST41). Specifically, the video image composition processing unit 14 acquires, for instance, road type and number of lanes from the road data included in map data read from the map database 5, and calculates the road width as 3.0×number of lanes (m), if the road type is an ordinary road, and 3.5×number of lanes (m) in the case of an expressway.

As in the content creation process of the arrow information in the car navigation devices according to Embodiment 1 and Embodiment 2, a route series and a left-right turn waypoint are acquired (step ST42), a straight travel series and a guidance waypoint are acquired (step ST43), and arrow information is created (step ST44). Thereafter, the content creation process of the arrow information is completed to return to the content creation process (FIG. 5).

As described above, when the map database 5 of the car navigation device does not hold road width data in the car navigation device according to Embodiment 3 of the present invention, the road width is calculated on the basis of the number of lanes of the road and the type of the road. Therefore, the road width can be appropriately set even when the map database 5 of the car navigation device does not hold road width data, so that there is averted the problem of display of an erroneous superimposing relationship between a guide arrow and buildings along the road.

Embodiment 4

Figure 11:
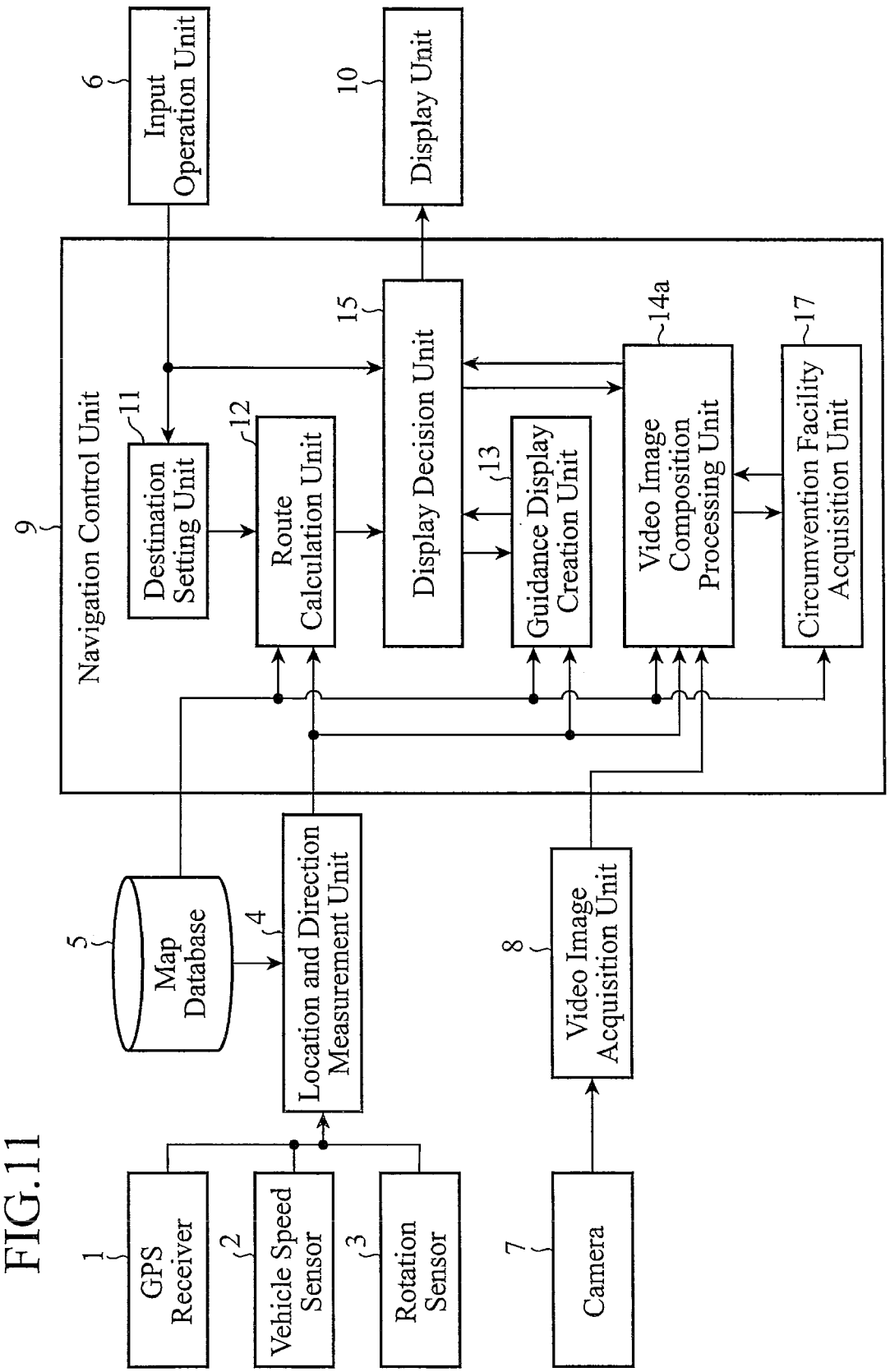
FIG. 11 is a block diagram showing the configuration of a car navigation device according to Embodiment 4 of the present invention.

FIG. 11 is a block diagram showing the configuration of a car navigation device according to Embodiment 4 of the present invention. The car navigation device of the present embodiment is the car navigation device according to Embodiment 1, but herein the road width acquisition unit 16 of the navigation control unit 9 has been omitted, a circumvention facility acquisition unit 17 has been added, and the video image composition processing unit 14 has been modified into a video image composition processing unit 14a.

Figure 12:
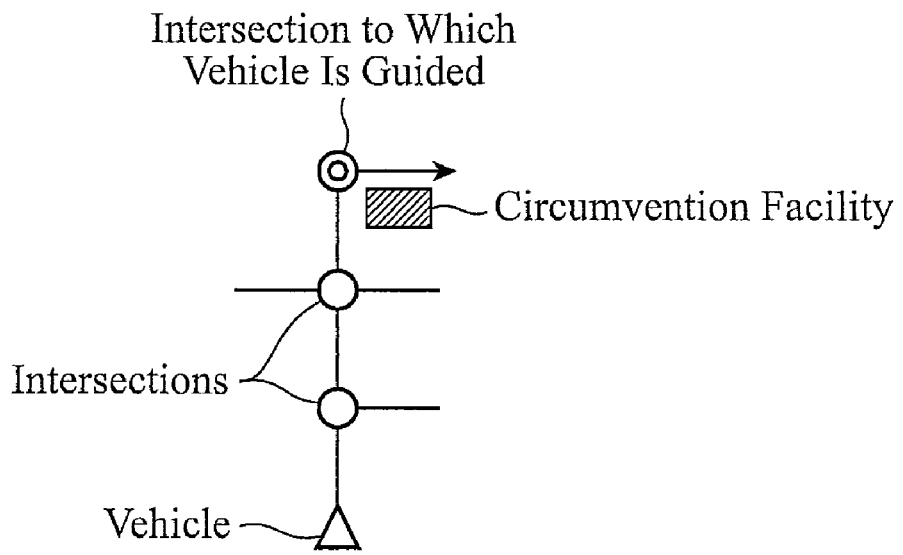
FIG. 12 is diagram for illustrating a circumvention facility at an intersection to which a vehicle is guided, used in the car navigation device according to Embodiment 4 of the present invention.

In response to an instruction from the video image composition processing unit 14a, the circumvention facility acquisition unit 17 acquires circumvention facility data that represents a facility to be circumvented by the vehicle (denoted by hatching in FIG. 12) at the intersection to which the vehicle is guided, as illustrated in FIG. 12, from map data read from the map database 5. More specifically, the circumvention facility acquisition unit 17 acquires guidance route data from the route calculation unit 12, via the video image composition processing unit 14a, and, on the basis of the acquired guidance route data, works out a guidance direction to the intersection to which the vehicle is guided. Next, the circumvention facility acquisition unit 17 searches, from among the map data read from the map database 5, for a facility (circumvention facility) that is located at a corner on the guidance direction side of the intersection to which the vehicle is guided, such that the facility stands closer to the vehicle than the intersection to which the vehicle is guided. The circumvention facility acquisition unit 17 acquires facility data that correspond to the found facility. The facility data acquired by the circumvention facility acquisition unit 17 is sent as circumvention facility data to the video image composition processing unit 14a.

In addition to the processing executed by the video image composition processing unit 14 of the car navigation device according to Embodiment 1, the video image composition processing unit 14a issues also an instruction to the circumvention facility acquisition unit 17 to the effect of acquiring circumvention facility data. The video image composition processing unit 14a carries out then a predetermined process (described in detail further below) on the circumvention facility data sent from the circumvention facility acquisition unit 17.

Next, the operation of the car navigation device according to Embodiment 4 of the present invention having the above configuration will be described. The operation of the car navigation device according to Embodiment 4 is identical to the operation of the car navigation device according to Embodiment 1, except for the content creation process of auxiliary information (step ST33 in FIG. 5) and the video composition process (process in step ST27 of FIG. 4). The explanation below focuses on the differences vis-à-vis the operation of the car navigation device according to Embodiment 1.

Figure 13:
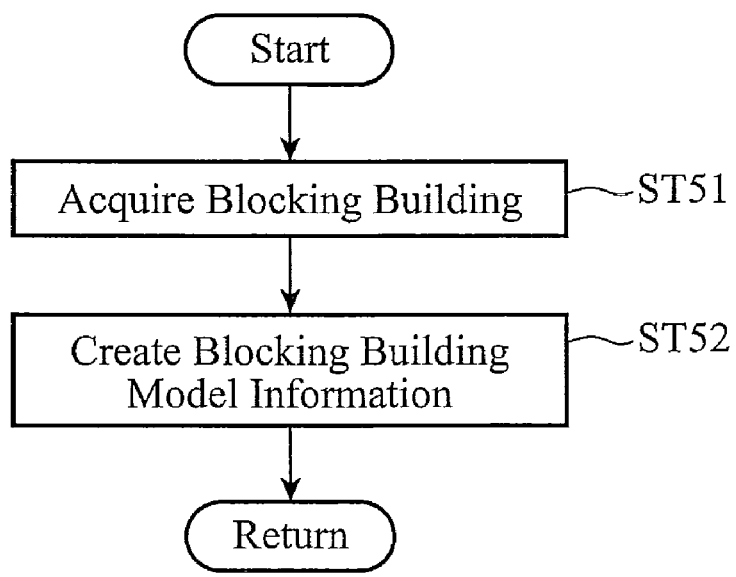
FIG. 13 is a flowchart illustrating the details of a content creation process of auxiliary information that is carried out in the content creation process of the car navigation device according to Embodiment 4 of the present invention.

First, the content creation process of auxiliary information in the car navigation device according to Embodiment 4 will be explained with reference to the flowchart shown in FIG. 13.

In the content creation process of auxiliary information (step ST33 in FIG. 5) there is created auxiliary content for displaying a left-right turn guide arrow, as supplementary content for display. In the following, an example that a blocking building is acquired from among buildings surrounding the vehicle, and that there is a created a content of a blocking building model will be described. A blocking building denotes herein a building that should be seen closer than the left-right turn guide arrow. The blocking building model is content that is actually displayed closer in the foreground than the left-right turn guide arrow at the location of the blocking building.

Figure 14:
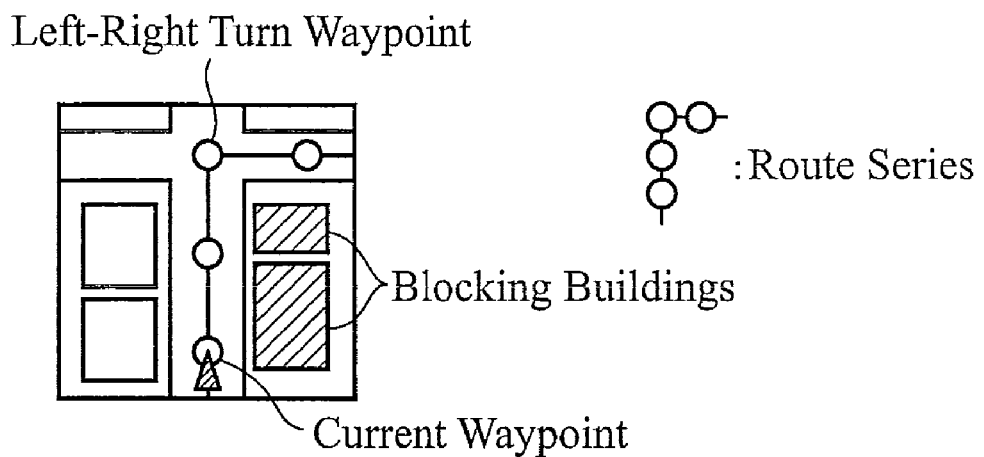
FIG. 14 is a diagram for illustrating a blocking building that is acquired by the car navigation device according to Embodiment 4 of the present invention.

In the content creation process of auxiliary information, a blocking building is acquired first (step ST51). Specifically, the video image composition processing unit 14a instructs the circumvention facility acquisition unit 17 to acquire a blocking building. The circumvention facility acquisition unit 17 acquires blocking building data from among map data read from the map database 5. Blocking buildings denote all the buildings that are present between the vehicle location and the intersection to which the vehicle is guided from among the buildings on the right of the road in the case of a right turn, for instance, as illustrated in FIG. 14. A configuration is also possible such that the blocking buildings are decided by taking into account the left-right turn guide arrow and the three-dimensional shape of the buildings.

Then, blocking building model information is created (step ST52). Specifically, the circumvention facility acquisition unit 17 creates a content of the blocking building model information on the basis of the blocking building data acquired in step ST51. Blocking building model information includes herein, for instance, at least one item from among the location, the three-dimensional shape and the name of the blocking building, as well as information that designates transparency or translucency. The blocking building model information may omit detailed three-dimensional shapes, and may define content such as, for instance, standing signboards. The blocking building model information created by the circumvention facility acquisition unit 17 is sent to the video image composition processing unit 14a. By way of the above, the content creation process of the auxiliary information is completed to return to the content creation process (FIG. 5).

Figure 15:
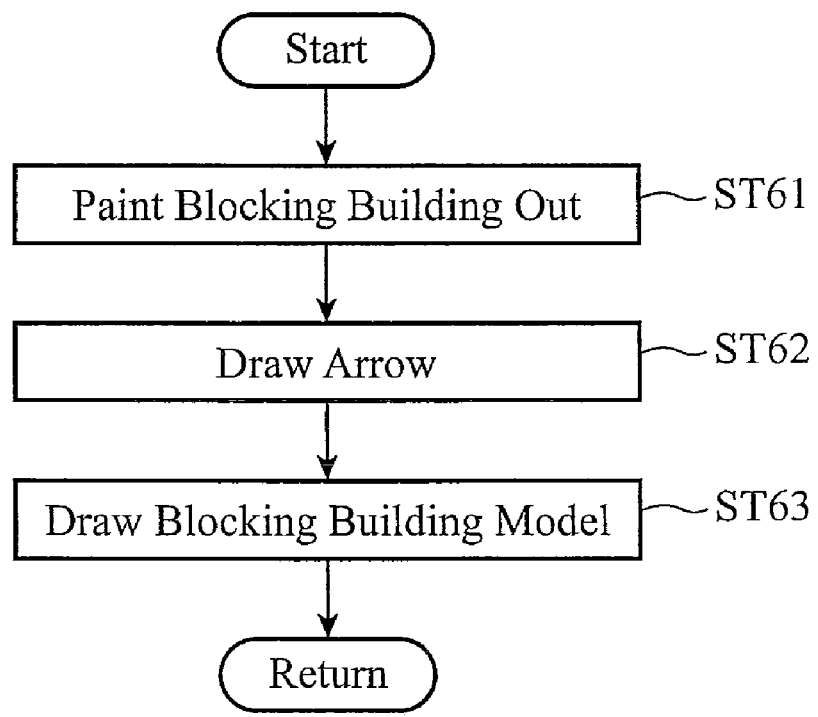
FIG. 15 is a flowchart illustrating the details of a video composition process that is carried out in the content-composed video creation process of the car navigation device according to Embodiment 4 of the present invention.

Next, the video composition process in the car navigation device according to Embodiment 4 will be described with reference to the flowchart illustrated in FIG. 15.

In the video composition process, a blocking building paint-out process is first carried out (step ST61). Specifically, the video image composition processing unit 14a paints out or fills a blocking building on the video acquired by the video image acquisition unit 8. The painted out region can be calculated on the basis of, for instance, the location on the video during the composition of the blocking building model. The paint-out process of the blocking building can be configured such that the blocking building to be painted out is subjected to image recognition through extraction of characteristic points from an image to thus calculate a paint-out region.

Figure 16:
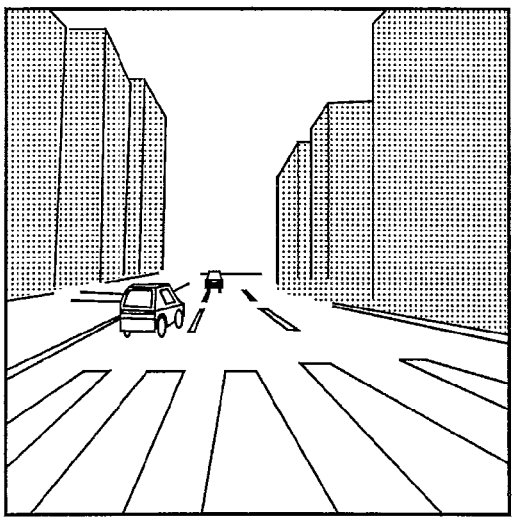
FIG. 16 is a diagram showing videos sequentially created in the video composition process that is carried out in the content-composed video creation process of the car navigation device according to Embodiment 4 of the present invention.
Figure 16:
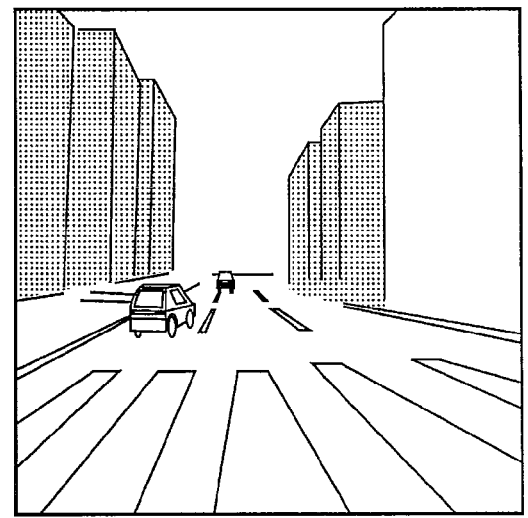
Figure 16:
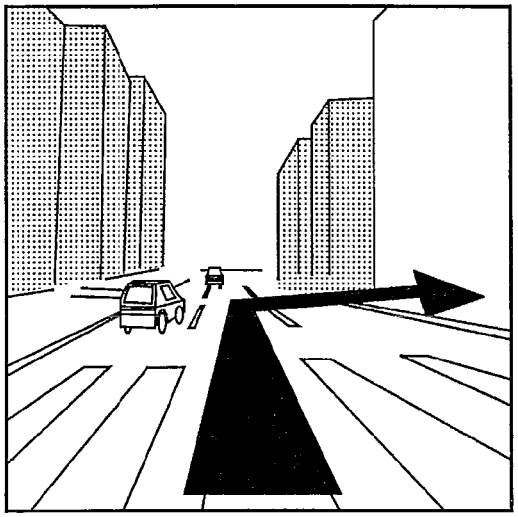
Figure 16:
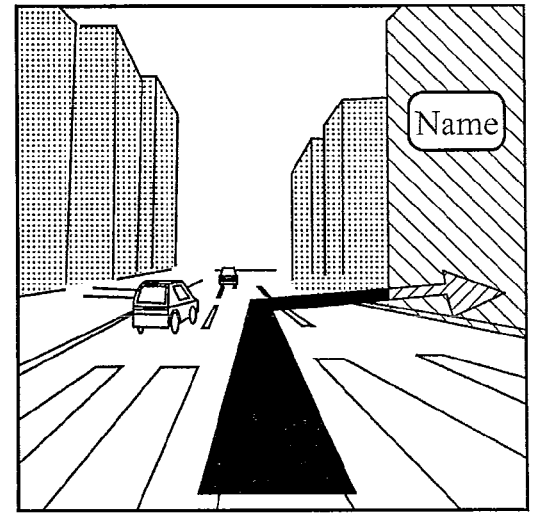

In the blocking building paint-out process, a building on the video, such as the building shown in FIG. 16(a), is painted out as shown in FIG. 16(b). In the example shown in FIG. 16(b), the blocking building is painted out in white, but maybe painted out in any color to be set beforehand by the user or the manufacturer of the car navigation device.

Then, an arrow is drawn (step ST62). Specifically, the video image composition processing unit 14a draws the left-right turn guide arrow created at the content creation process of the arrow information in the content creation process (step ST32 in FIG. 5). In such a way, a left-right turn guide arrow is drawn on the video where the blocking building is painted out, as shown in FIG. 16(c).

Then, a blocking building model is drawn (step ST63). Specifically, the video image composition processing unit 14a draws, by three-dimensional CG, a translucent blocking building model created in the content creation process of auxiliary information (step ST33 in FIG. 5). In this way, a translucent blocking building model is drawn on a video on which a left-right turn guide arrow is drawn, as shown in FIG. 16(d). By way of the above, the video composition process is completed to return to the content-composed video creation process (FIG. 4).

Figure 17:
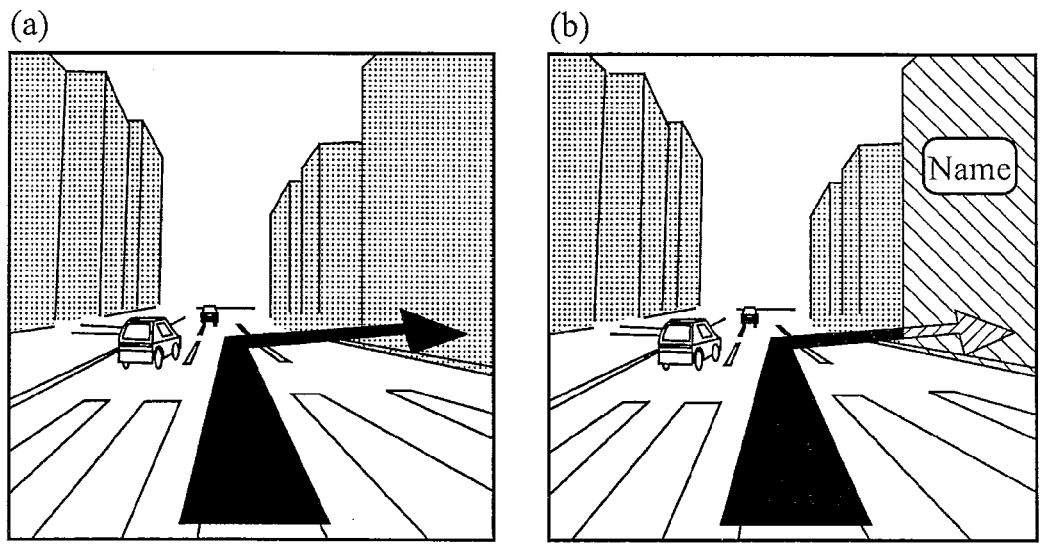
FIG. 17 is a diagram showing an example of videos displayed on the screen of a display unit in the car navigation device according to Embodiment 4 of the present invention.

FIG. 17 shows an example of videos displayed on the screen of the display unit 10 by way of the above-described processes. FIG. 17(a) depicts a display example of a route guide arrow in a conventional car navigation device. The circumvention facility is not clear, and hence the user may confuse the intersection at which the vehicle is to turn. In the display example of the route guide arrow of the car navigation device according to Embodiment 4 shown in FIG. 17(b), by contrast, the portion of the route guide arrow that denotes the turning direction can be seen at the other side of the circumvention facility, and hence the user can easily grasp the intersection at which the vehicle is to turn.

Figure 18:
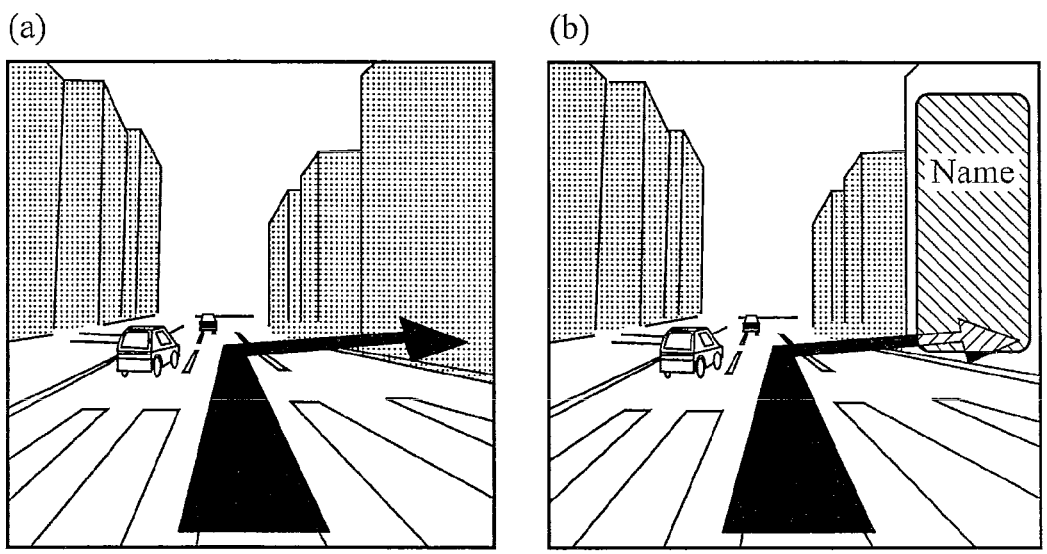
FIG. 18 is a diagram showing another example of a video displayed on the screen of a display unit in the car navigation device according to Embodiment 4 of the present invention.

The blocking building model may be a signboard-like blocking building model, as in the display example depicted in FIG. 18. The blocking building model in the example shown in FIG. 17 is rendered as a translucent three-dimensional CG. In the example shown in FIG. 18, the blocking building model is depicted as a signboard that indicates the name of the facility.

As described above, in the car navigation device according to Embodiment 4 of the present invention, there is painted out the location of a building to be displayed closer in the foreground than (or before) the portion of the route guide arrow that indicates a turning direction, and there is used the route guide arrow and a translucent three-dimensional CG that represents the building, in such a manner so as to depict the route guide arrow as circumventing the rear of the building. A correct superimposing relationship of the route guide arrow and buildings along the road can be displayed as a result.

Embodiment 5

In the car navigation device according to Embodiment 5 of the present invention, there is used a blocking building signboard instead of the blocking building model used in the car navigation device according to Embodiment 4. The configuration of the car navigation device of Embodiment 5 is identical to that of Embodiment 4 shown in FIG. 11.

Except for the content creation process of auxiliary information (step ST33 in FIG. 5) and the video composition process (process in step ST27 of FIG. 4), the operation of the car navigation device according to Embodiment 5 is identical to that of the car navigation device according to Embodiment 4.

First, the content creation process of auxiliary information in the car navigation device according to Embodiment 5 will be explained with reference to the flowchart illustrated in FIG. 13 used to illustrate the content creation process of auxiliary information in the car navigation device according to Embodiment 4.

In the content creation process of auxiliary information (step ST33 in FIG. 5) there is created auxiliary content for displaying a left-right turn guide arrow, as supplementary content for display. In the following, an example that a blocking building is acquired from among buildings surrounding the vehicle, and that there is created a content of a signboard of the blocking building will be described. A blocking building denotes herein a building that should be seen closer than the left-right turn guide arrow. The blocking building signboard is content that is actually displayed closer in the foreground than a left-right turn guide arrow at the location of the blocking building. The details of the above process are explained later.

In the content creation process of auxiliary information, a blocking building is first acquired (step ST51). The processing in step ST51 is identical to that carried out in the car navigation device according to Embodiment 4.

Then, blocking building signboard information is created (step ST52). Specifically, the circumvention facility acquisition unit 17 creates a content of the blocking building signboard information, on the basis of the blocking building data acquired in step ST51. Blocking building signboard information includes herein, for instance, at least one item from among a location that indicates a blocking building, or the name of the blocking building, as well as information that designates transparency or translucency. For instance, there can be determined the cross-point between the road and a perpendicular line drawn from the location of the blocking building up to the road, and then the midpoint between the location of the blocking building and that cross-point may be set as the location that indicates the blocking building. The blocking building signboard information created by the circumvention facility acquisition unit 17 is sent to the video image composition processing unit 14a. By way of the above, the content creation process of the auxiliary information is completed to return to the content creation process (FIG. 5).

Next, a video composition process in the car navigation device according to Embodiment 5 (step ST27 in FIG. 4) will be described. In the video composition process, upon left-right turn guidance, the video image composition processing unit 14a draws, by translucent CG, the blocking building signboard created in step ST33, such that the blocking building signboard is displayed closer in the foreground than the portion of the route guide arrow that indicates the turning direction on the portion of the left-right turn guide arrow that indicates the turning direction and that is created to be closer than the blocking building acquired from map data in step ST32 of content creation process shown in FIG. 5.

Figure 19:
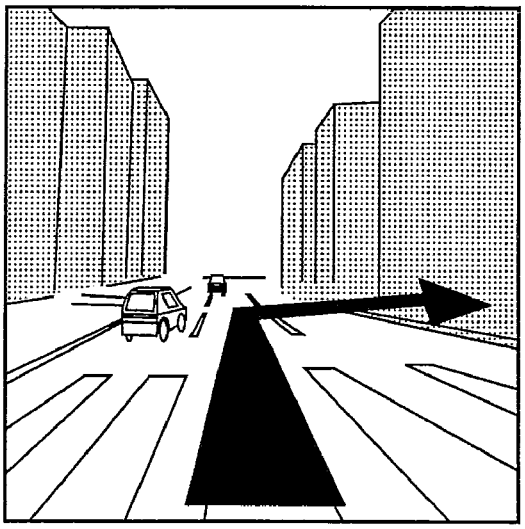
FIG. 19 is a diagram showing an example of video displayed on the screen of a display unit in a car navigation device according to Embodiment 5 of the present invention.
Figure 19:
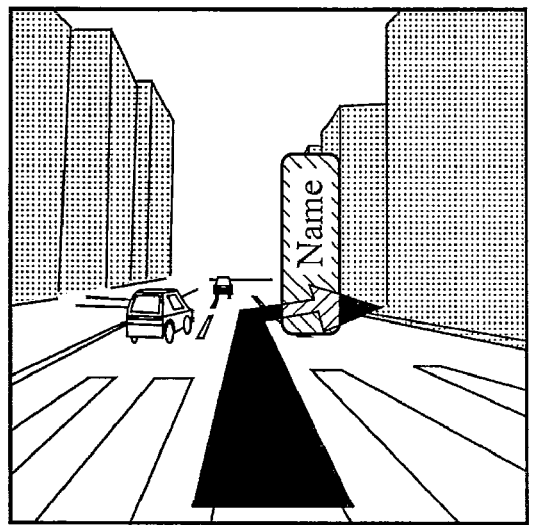

FIG. 19 shows an example of video displayed on the screen of the display unit 10 by way of the above-described processes. FIG. 19(a) depicts a display example of a live-action guide map in a conventional car navigation device. The buildings along the road and the route guide arrow are not clear, and hence the user may confuse the intersection at which the vehicle is to turn. In the display example of the live-action guide map of the car navigation device according to Embodiment 5 shown in FIG. 19(b), by contrast, the buildings along the road and the route guide arrow are clear, and hence the user can easily grasp the intersection at which the vehicle is to turn.

As described above, according to the car navigation device according to Embodiment 5 of the present invention, the length of the route guide arrow is set to reach the front of a building, instead of the guide arrow being overlaid on the route buildings, and a translucent CG that depicts a signboard of the building is rendered so as to be displayed closer in the foreground than the portion of a route guide arrow that indicates the turning direction. Therefore, display can be performed in such a manner that the superimposing relationship between a route guide arrow and buildings along the road can be grasped correctly without hiding the actual buildings.

A car navigation device used in vehicles has been described in the embodiments illustrated in the figures. However, the car navigation device according to the present invention can also be used, in a similar manner, in other mobile objects such as cell phones equipped with cameras, or in airplanes.

INDUSTRIAL APPLICABILITY

In the navigation device according to the present invention, as described above, the length of a route guide arrow that indicates a turning direction is set in accordance with road width during display of a route guide arrow overlaid on a video of the surroundings of a vehicle that is obtained by camera capture, in such a manner that the route guide arrow is not superimposed on buildings to be displayed closer in the foreground than the route guide arrow. This allows avoiding the problem of display of an erroneous superimposing relationship between a route guide arrow and buildings along the road, and allows appropriately displaying guidance information on live-action video. The navigation device according to the present invention can be suitably used thus in car navigation devices and the like.

The invention claimed is:

1. A navigation device comprising:
a map database that holds map data;
a location and direction measurement unit that measures a current location and direction of a vehicle;
a route calculation unit that, based on map data read from the map database, calculates a route from the current location measured by the location and direction measurement unit to a destination;
a camera that captures video images ahead of the vehicle;
a video image acquisition unit that acquires the video images ahead of the vehicle that are captured by the camera;
a road width acquisition unit that calculates, based on road width included in the map data read from the map database, width of a road segment on which the vehicle is traveling, where the road segment is included in the route calculated by the route calculation unit;
a video image composition processing unit that generates, when detecting an intersection to be guided as a point of right-turn or left-turn on the traveling road, a graphical content of an arrow indicating a direction of right-turn or left-turn at said intersection, and superposes the generated graphical content of the arrow onto the video images acquired by the video image acquisition unit, where a tip of the arrow is disposed within a range of the width of the traveling road calculated by the road width acquisition unit; and
a display unit that displays the video image composed by the video image composition processing unit.

2. A navigation device according to claim 1,
wherein the road width acquisition unit calculates the width of the traveling road on the basis of data on the number of lanes and road type data included in the map data read from the map database.

3. A navigation device comprising:
a map database that holds map data;
a location and direction measurement unit that measures a current location and direction of a vehicle;
a route calculation unit that, based on map data read from the map database, calculates a route from the current location measured by the location and direction measurement unit to a destination;
a camera that captures video images ahead of the vehicle;
a video image acquisition unit that acquires the video images ahead of the vehicle that are captured by the camera;
a road width acquisition unit that calculates, based on road width included in the map data read from the map database, width of a road segment on which the vehicle is traveling, where the road segment is included in the route calculated by the route calculation unit;
a video image composition processing unit that generates, when detecting an intersection to be guided as a point of right-turn or left-turn on the traveling road, a graphical content of an arrow indicating a direction of right-turn or left-turn at said intersection, and superposes the generated graphical content of the arrow onto the video images acquired by the video image acquisition unit, where a portion of the graphical content of the arrow, which is outside of the calculated width of the traveling road, differs from another portion of said graphical content in display format; and
a display unit that displays the video image composed by the video image composition processing unit.

4. A navigation device according to claim 3, wherein the display format includes one or more of a thickness, a color, a translucency, a brightness and a saturation.

5. A navigation device comprising:
a map database that holds map data;
a location and direction measurement unit that measures a current location and direction of a vehicle;
a route calculation unit that, based on map data read from the map database, calculates a route from the current location measured by the location and direction measurement unit to a destination;
a camera that captures video images ahead of the vehicle;
a video image acquisition unit that acquires the video images ahead of the vehicle that are captured by the camera;
a facility acquisition unit that acquires, from the map database, data about a circumvention facility which is between an intersection to be guided as a point of right-turn or left-turn on the traveling road and a current location of the vehicle, where a location of the circumvention facility corresponds to a guidance direction of right-turn or left-turn at the intersection;

a video image composition processing unit that superposes a graphical content of an arrow indicating a direction of right-turn or left-turn at the intersection onto the video images acquired by the video image acquisition unit by
  painting out a portion of the circumvention facility in the video images acquired by the video image acquisition unit,
  disposing the graphical content of the arrow onto the video images in which the circumvention facility is painted out, and
  disposing a translucent image of the circumvention facility onto the painted out portion of the video images on which the graphical content of the arrow is disposed; and
a display unit that displays the video image composed by the video image composition processing unit.

6. A navigation device according to claim 5, wherein the video image composition processing unit disposes a translucent image in three-dimensional CG as the translucent image of the circumvention facility.

7. A navigation device comprising:
a map database that holds map data;
a location and direction measurement unit that measures a current location and direction of a vehicle;
a route calculation unit that, based on map data read from the map database, calculates a route from the current location measured by the location and direction measurement unit to a destination;
a camera that captures video images ahead of the vehicle;
a video image acquisition unit that acquires the video images ahead of the vehicle that are captured by the camera;
a facility acquisition unit that acquires, from the map database, data about a circumvention facility which is between an intersection to be guided as a point of right-turn or left-turn on the traveling road and a current location of the vehicle, where a location of the circumvention facility corresponds to to guidance direction of right-turn or left-turn at the intersection;
a video image composition processing unit that superposes a graphical content of an arrow indicating a direction of right-turn or left-turn at the intersection onto the video images acquired by the video image acquisition unit by
  disposing the graphical content of the arrow onto the video images acquired by the video image acquisition unit, and
  disposing a translucent image representing information about the circumvention facility onto a portion of the disposed graphical content corresponding to the right-turn or left-turn of the arrow,
  where a tip of the arrow is in front of the circumvention facility in the video images; and
a display unit that displays the video image composed by the video image composition processing unit.

8. A navigation device according to claim 7, wherein the video image composition processing unit disposes a translucent image representing a location or name of the circumvention facility as the translucent image representing information about the circumvention facility.

* * * * *